No. 770,909. PATENTED SEPT. 27, 1904.
S. R. KENNEDY.
PROCESS OF CONDENSING MILK.
APPLICATION FILED MAY 13, 1903.
NO MODEL.
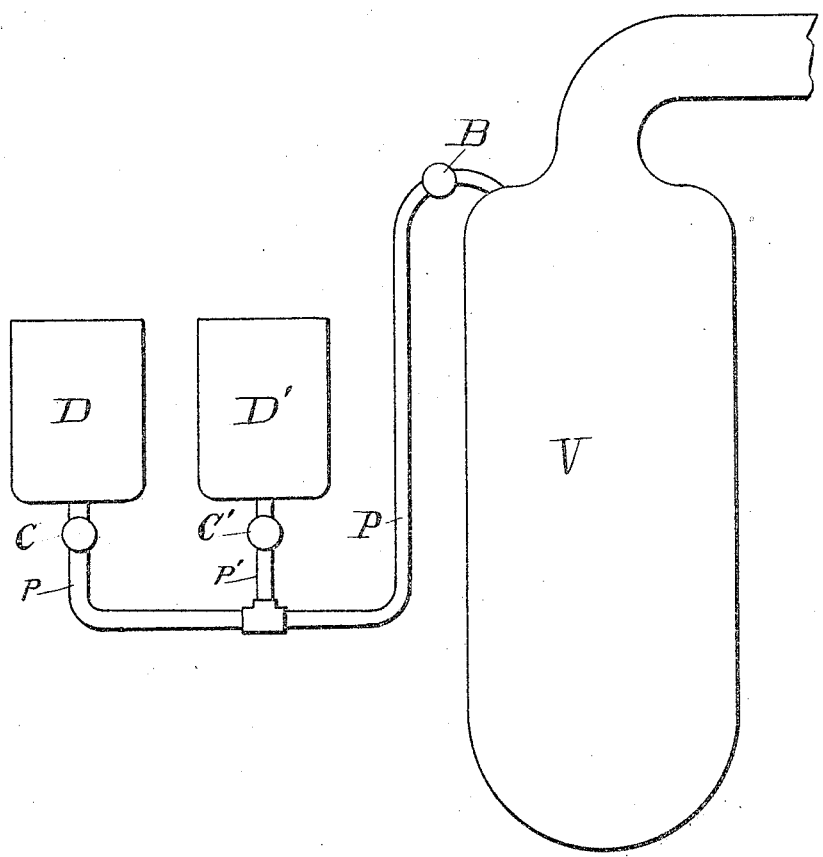
WITNESSES:
INVENTOR.
Samuel Ridgway Kennedy
BY
John Dolman
ATTORNEY.

No. 770,909. Patented September 27, 1904.

UNITED STATES PATENT OFFICE.

SAMUEL RIDGWAY KENNEDY, OF PHILADELPHIA, PENNSYLVANIA.

PROCESS OF CONDENSING MILK.

SPECIFICATION forming part of Letters Patent No. 770,909, dated September 27, 1904.

Application filed May 13, 1903. Serial No. 156,987. (No specimens.)

*To all whom it may concern:*

Be it known that I, SAMUEL RIDGWAY KENNEDY, a citizen of the United States, residing at Philadelphia, in the county of Philadelphia and State of Pennsylvania, have invented a new and useful Improvement in the Process of Condensing Milk, of which the following is a specification.

Milk or cream condensed in the ordinary way has certain defects, among which are the precipitation of the salts and sugar of milk, forming the so-called "sand-sugar" under certain conditions, and other defects of flavor and consistency, which are more fully set out in my pending application, Serial No. 152,792, wherein I claim an improvement in the process of condensing milk by which these defects are largely removed.

The subject-matter of this present application is the method of combining fresh unmanipulated cream with condensed milk which has preferably been previously prepared according to the process forming the subject-matter of my application, Serial No. 152,792, above referred to.

In detail my improved process is as follows: Taking whole milk, I separate the cream therefrom in the ordinary way in a centrifugal. The cream (which may be pasteurized, if desired) is now put aside in refrigeration and the remaining milk condensed in any manner, but preferably in my improved manner above referred to. After the milk is condensed and refrigerated it is placed in one fore-warmer of a vacuum-pan, and the proper proportion of fresh cream is placed in another fore-warmer. A vacuum as high as possible is now pumped in the vacuum-pan. The cocks from the two fore-warmers are opened sufficiently to allow the proper proportions of milk and cream to pass to the vacuum-pan, where they are sprayed down through the vacuum. They will be found to make an extremely fine spray and to combine and emulsify perfectly even more homogeneously and permanently than in the fresh whole milk. No special means for spraying are required, as the fluid entering the high vacuum through an open pipe will instantly form a fine spray or mist.

Referring now to the drawing forming part of this application, the figure represents an ordinary vacuum-pan with two fore-warmers in relative diagrammatic position.

V is the vacuum-pan proper; D and D', the two fore-warmers. The discharge-pipes $p$ and $p'$ join before entering the vacuum-pan into a single pipe P, which ordinarily enters the vacuum-pan somewhere on the side, but which I prefer to enter near the top, as shown, so the spray can fall through the entire vacuum. The end of the pipe P is not provided with any special spraying apparatus, but is an ordinary open pipe. It is best, however, to slightly enlarge or ream out the end of the pipe to prevent the possible formation of drops at its edge. This is the customary practice in vacuum-pans. The two cocks C and C' regulate the relative amounts of milk and cream to pass over into the vacuum-pan. There is also a cock usually provided at B, which can be used to stop at once the entire flow of fluid to the vacuum-pan in case of threatened entrainment or other accident.

The advantages of my improved process are the production of condensed milk with a fresh cream flavor and the non-separation of the butter-fats or cream therein.

Having, as above, fully described my invention and the best method known to me of preparing the same, what I claim, and desire to secure by Letters Patent, is—

1. The improved process of condensing milk and cream by separating the milk from the cream, condensing the milk, and recombining the condensed milk and fresh cream by spraying the two together through a high vacuum.

2. The improved process of combining cream with condensed milk by spraying the two together through a high vacuum.

In testimony whereof I have signed my name to this specification in the presence of two subscribing witnesses.

SAMUEL RIDGWAY KENNEDY.

Witnesses:
  HENRY S. CALLAWAY,
  JOHN DOLMAN.